United States Patent
Roehm et al.

(10) Patent No.: US 7,936,148 B2
(45) Date of Patent: *May 3, 2011

(54) BATTERY-OPERATED SCREWDRIVER AND CHARGER SHELL THEREFOR

(75) Inventors: Heiko Roehm, Stuttgart (DE); Julian Bergmann, Stuttgart (DE); Jean-Paul Meeuwissen, Etten-Leur (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/798,117

(22) Filed: Mar. 29, 2010

(65) Prior Publication Data

US 2010/0194338 A1   Aug. 5, 2010

Related U.S. Application Data

(63) Continuation of application No. 12/434,885, filed on May 4, 2009, now Pat. No. 7,723,953, which is a continuation of application No. 10/573,627, filed as application No. PCT/EP2005/052853 on Jun. 20, 2005, now Pat. No. 7,546,785.

(30) Foreign Application Priority Data

Aug. 9, 2004 (DE) .......................... 10 2004 038 788

(51) Int. Cl.
*H02J 7/00* (2006.01)
(52) U.S. Cl. ........................................ 320/112; 320/114
(58) Field of Classification Search .................. 320/112, 320/114; 206/349; 173/48, 217; 81/436
See application file for complete search history.

(56) References Cited

U.S. PATENT DOCUMENTS

| | | | |
|---|---|---|---|
| 3,329,185 A | 7/1967 | Hettich et al. | |
| 3,369,615 A | 2/1968 | Maffey, Jr. et al. | |
| 3,783,364 A | 1/1974 | Callanis et al. | |
| 4,078,589 A | 3/1978 | Miller | |
| 4,493,223 A | 1/1985 | Kishi et al. | |
| 4,677,362 A * | 6/1987 | House et al. | 320/115 |
| 4,703,852 A | 11/1987 | Verdier | |
| 4,751,452 A | 6/1988 | Kilmer et al. | |
| 4,804,048 A | 2/1989 | Porth, Jr. | |

(Continued)

FOREIGN PATENT DOCUMENTS

CH         675 330         9/1990

(Continued)

OTHER PUBLICATIONS

"3 New Rechargeable Drill/Drivers" Black & Decker Published in 1985.

(Continued)

*Primary Examiner* — Edward Tso
*Assistant Examiner* — M'Baye Diao
(74) *Attorney, Agent, or Firm* — Kenyon & Kenyon LLP

(57) ABSTRACT

A battery-operated screwdriver has a housing with a handle, a rechargeable battery, charge contacts for charging the battery on a charger shell having at least one detachably mounted bit holder for storing tool inserts of the battery-operated screwdriver in captive fashion, so that the battery-operated screwdriver is placeable on the charger shell and a charging mode is produced automatically, and a charger shell for a battery-operated screwdriver has at least one detachable mountable bit holder configured to receive a plurality of bits which in operation are insertable in communication with the battery-operated screwdriver.

23 Claims, 8 Drawing Sheets

U.S. PATENT DOCUMENTS

| | | | |
|---|---|---|---|
| 4,951,756 A | 8/1990 | Everett et al. | |
| 5,054,563 A | 10/1991 | Zapf | |
| 5,336,953 A | 8/1994 | Allemann | |
| 5,496,139 A | 3/1996 | Ghode et al. | |
| 5,533,843 A | 7/1996 | Chung | |
| 6,066,938 A | 5/2000 | Hyodo et al. | |
| 6,102,134 A | 8/2000 | Alsruhe | |
| 6,151,741 A | 11/2000 | Chen | |
| 6,191,554 B1 | 2/2001 | Nakane et al. | |
| 6,267,238 B1 | 7/2001 | Miller et al. | |
| 6,364,033 B1 | 4/2002 | Hung et al. | |
| 6,510,768 B2 | 1/2003 | Fruhm | |
| 6,547,013 B2 | 4/2003 | Riedl et al. | |
| 6,702,530 B2 | 3/2004 | Bennage et al. | |
| 7,073,417 B2 | 7/2006 | Beauchamp | |
| 7,360,606 B2 * | 4/2008 | Saur et al. | 173/29 |
| 7,546,785 B2 | 6/2009 | Roehm et al. | |
| 2002/0130007 A1 | 9/2002 | Nakamura et al. | |
| 2002/0184979 A1 | 12/2002 | Fruhm | |
| 2003/0015066 A1 | 1/2003 | Chao | |
| 2003/0070511 A1 | 4/2003 | Nottingham et al. | |
| 2004/0017177 A1 | 1/2004 | Sanatana, Jr. | |
| 2005/0194928 A1 * | 9/2005 | Hou | 320/114 |
| 2006/0104735 A1 | 5/2006 | Zeiler et al. | |
| 2007/0120527 A1 | 5/2007 | Roehm et al. | |
| 2009/0211410 A1 | 8/2009 | Roehm et al. | |

FOREIGN PATENT DOCUMENTS

| | | |
|---|---|---|
| EP | 0 176 210 | 4/1986 |
| EP | 0 951 127 | 10/1999 |
| EP | 0 978 923 | 2/2000 |
| EP | 1 066 930 | 1/2001 |
| EP | 1 778 444 | 5/2007 |
| GB | 2375497 A | 11/2002 |

OTHER PUBLICATIONS

Black & Decker Product Brochure "Indoor Catalogue", Published in Mar. 1989.

Black & Decker Professional and Home Use Power Tools/Accessories '89/'90 Catalog, 4 pages.

* cited by examiner

BATTERY-OPERATED SCREWDRIVER AND CHARGER SHELL THEREFOR

CROSS-REFERENCE TO RELATED APPLICATIONS

This application is a continuation of U.S. patent application Ser. No. 12/434,885 filed on May 4, 2009 now U.S. Pat. No. 7,723,953, which is a continuation of U.S. patent application Ser. No. 10/573,627 filed on Mar. 28, 2006, which issued as U.S. Pat. No. 7,546,785 on Jun. 16, 2009, which is a national phase application based on international application PCT/EP05/52853 filed on Jun. 20, 2005, and claims priority to German Patent Application No. 10 2004038788.5, filed on Aug. 9, 2004, all of which are hereby incorporated by reference in their entirety.

The invention described and claimed hereinbelow is also described in German Patent Application DE 10 2004 038 788.5 filed on Aug. 9, 2004. This German Patent Application, whose subject matter is incorporated here by reference, provides the basis for a claim of priority of invention under 35 U.S.C. 119(a)-(d).

BACKGROUND OF THE INVENTION

The present invention relates to a battery-operated screwdriver, and also to a charger shell for a battery-operated screwdriver.

Battery-operated screwdrivers are already available in the 2.4V to 3.6V power class, as known for instance from European Patent Disclosure EP 1 066 930. They usually have NiCd cells as energy-storing means, an ON/OFF switch with a short switch button, and without continuously variable speed governing they have both a switch for switchover from counterclockwise to clockwise operation, a gear, in particular a planetary gear, that steps the motor rpm down, and a motor with a standard diameter of 27.5 mm. There are rodlike and pistol-shaped versions as well as versions with a grip whose angle can be adjusted. For charging, these devices are either connected to a charger via a plug—in the manner of a cell phone or electric shaver—or are connected to contacts via a mount into which the device is placed. The mounts can be secured to a wall, for instance, to make handling for charging simpler.

For that purpose, the charging mode must be brought about for both the charger and the electrical connection, but this does not happen automatically after every use. As a result, the device is often not ready for use precisely when it is needed, and the familiar memory effect for conventional NiCd batteries is another disadvantage. After a certain amount of time of not outputting power, NiCd batteries discharge, and so battery-operated screwdrivers equipped with them discharge partially after a short time even when not used. If they are put in the charging mode when they are partially discharged, then after charging, because of the memory effect, only the difference from the newly charged quantity—and hence reduced power—is available.

Another disadvantage of the known battery-operated screwdrivers is the limited availability of screwdriver bits and various tool inserts.

SUMMARY OF THE INVENTION

Accordingly, it is an object of the present invention to provide a battery-operated screwdriver, and also a charger shell for a battery-operated screwdriver, which eliminated the disadvantages of the prior art.

In keeping with these objects and with others which will become apparent hereinafter, one feature of the present invention resides, briefly stated in a battery-operated screwdriver, comprising a housing with a handle, a rechargeable battery, charge contacts for charging the battery on a charger shell having at least one detachably mounted bit holder for storing tool inserts of the battery-operated screwdriver in captive fashion, so that the battery-operated screwdriver is placeable on the charger shell and a charging mode is produced automatically.

Another feature of the present invention resides in a charger shell for a battery-operated screwdriver, comprising at least one detachable mountable bit holder configured to receive a plurality of bits which in operation are insertable in communication with the battery-operated screwdriver.

A further feature of the present invention resides in a charger shell for a battery-operated screwdriver, comprising at least one detachably mountable bit holder configured to receive a plurality of bits in which an operation are insertable in communication with a battery-operated screwdriver that has a housing with a handle, a rechargeable battery, and charge contact tongues for charging the battery on the charger shell, the charger shell being configured so that when the battery-operated screwdriver is placed on the charger shell the charging mode is produced automatically.

When the battery-operated screwdriver is placed on the charger shell the charging mode is produced automatically and it has the advantage that the battery-operated screwdriver can always be picked up quickly and securely at the same place, with its full available charged capacity, it can be manufactured economically, and is extremely lightweight and handy.

Since there is almost no self-discharging in a lithium ion cell, the battery-operated screwdriver is fully ready for use even after long periods when it is not in use, and in such periods the battery-operated screwdriver can rest for an arbitrarily long time on the charger shell in the charging mode. The charger shell can be placed, standing securely, on a flat storage shelf and need not be secured or firmly held when the battery-operated screwdriver is being removed. As a result, it can always be removed quickly with only one hand; no plug has to be unplugged and no mount has to be removed. Moreover, it is automatically assured at all times that the battery-operated screwdriver is charged.

The charge contact tongues soldered to the circuit board protrude through openings in the lower end of the handle and in the charging position are contacted by counterpart contacts of the charger shell; no additional cords or coupling plugs have to be actuated.

Depending on the direction of rotation of the motor, either a green light-emitting diode or LED—acting as a directional arrow pointing forward—or a red LED—as a directional arrow pointing to the rear—soldered to the circuit board lights up. These LEDs are visible through openings in the housing, which are covered by means of a transparent plastic part acting as a window. A further LED with a rectangular frame, located between them, serves as a charge control light or charge status indicator.

Because only a single long, slender lithium ion (Li ion) cell fixedly built into the handle of the battery-operated screwdriver is used, instead of a plurality of ⅘ sub-C nickel-cadmium cells as a rechargeable battery, an especially small circumference of the grip can be achieved.

Two relatively large, hard spiral springs keep the ON/OFF button prestressed in its off position, and by fast opening and closing of the contacts, given their increasingly high impedance over the service life, prevent their becoming fused to the contact plate.

The long ON/OFF button has a short actuation stroke, and as a result, it is especially easily actuatable at any arbitrary location in a way that switches on reliably. As a result—regardless of the actuation position—only slight operator control forces are necessary, and the device can be switched on comfortably in virtually any position of the user's hand. To improve the guidance of the ON/OFF button relative to the housing, the ON/OFF button has two lateral guide tongues on its inside, which are slidingly supported in a braced fashion in the housing.

A further volumetric reduction of the battery-operated screwdriver is achieved by means of a compact construction of the gear and gearbox; the gear, as a planetary gear, is merely placed in the cylindrical gearbox and is prevented from falling out by an axial securing plate, and the gearbox itself, with internal toothing, also acts as a sun wheel.

Because the motor housing is composed of half shells slit in the middle, which embrace the gearbox from both sides in the manner of tongs with radially inward-protruding support tongues and keep it centered in the installed position, the gearbox can be connected precisely and securely to the motor housing without separate fastening elements such as screws or overlocking elements.

A further reduction in the weight and volume of the battery-operated screwdriver is achieved by dispensing with a chuck; by means of a hexagonal socket in the power takeoff shaft—fitting corresponding screwdriver or drilling bits with a hexagonal shaft—these tools can be changed quickly and simply.

The ON/OFF button and the switch for reducing the direction of rotation are designed such that on the one hand, when the ON/OFF button is pressed, the switch for reducing the direction of rotation is blocked and cannot be moved, and on the other, the ON/OFF button is blocked and cannot be pressed into the ON position when the switch for reducing the direction of rotation is in the middle position, which is the recommended transport position.

The gearbox, the circuit board with the battery, motor, LEDs, and electrical elements, as well as the switch button with contact plate and springs, and the transparent plastic part are placed in a first half shell; the second half shell is placed over it and closed with only four identical screws and is thus completely mounted and makes for a very economical embodiment.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
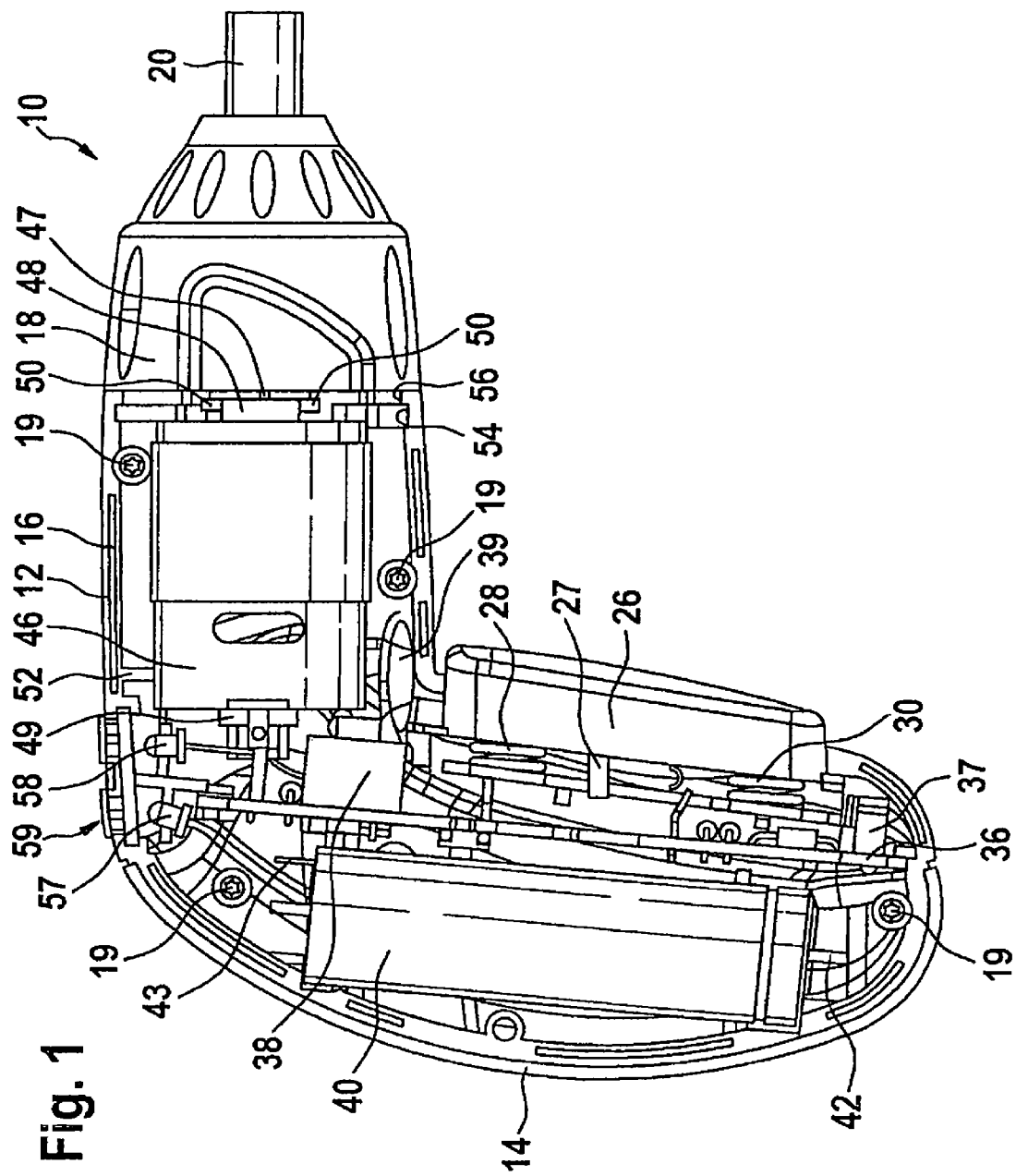
FIG. 1 is a side view of the partly opened battery-operated screwdriver.

FIG. 1 shows a pistol-like battery-operated screwdriver 10 with a motor housing 12 aligned with the screwing direction and with a handle 14 at an angle from the housing. The motor housing 12 with the handle 14 is formed of two half shells 16, 17, which can be put together, braced tightly against one another, in a central plane 15. To that end, four screws extend through bores in the one half shell 17 into four screw domes 19 in the other half shell 16 and hold the two firmly against one another.

An ON/OFF button 26 extends over the internal length of the handle 14, for actuating a switch, not identified by reference numeral. Because of its particular length, the ON/OFF button 26 makes it easy to switch the battery-operated screwdriver 10 on and off, even in positions in which it is difficult to hold the battery-operated screwdriver. On its long sides, it is provided with support tongues 27 that enter the handle 14 laterally and form a secure guide on corresponding counterpart faces of the half shells 16, 17 and enable a precise, play-free back-and-forth motion.

The ON/OFF button 26 is braced elastically on the handle 14 via two hard compression springs 28, 30, so that after the battery-operated screwdriver is switched on, the springs 28, 30 automatically return the ON/OFF button 26, when it is let go, to its off position and stop the motion of the motor. The actuation stroke is limited by stops, not identified by reference numeral, and with a length of 1 to 4 mm is very short and user-friendly.

For the entry of the ON/OFF button 26 into the motor housing 12, a corresponding opening 29, half of it located in each of the half shells 16, 17, is provided which closely embraces the ON/OFF button 26 and guides it in shaftlike fashion. The ON/OFF button 26, on its face end toward the handle 14, has one longitudinally protruding tongue each at the top and bottom; these tongues protrude past the opening 29 and are braced from inside on its edge and keep the ON/OFF button 26 braced thereon in the off position and prevent its coming loose from the housing 12.

The circuit board 36, in its lower region, has two symmetrical symmetrically arranged charge contact tongues 37, which emerge from the plane of the circuit board 36 at a right angle and then each form large bearing faces bent outward at an angle on the end. These faces penetrate each half shell 16, 17 symmetrically to the center plane 15 in the lower end of the handle 14. At each place where they pass through it, they are embedded in "countersunk" fashion in a respective indentation inside the contour of the handle and are accessible for the outward-protruding charge contacts 23 of the charger shell 22, which they fit over in the charging state when resting on the charger shell 22 and are braced, securely contacted, because of their resilient arrangement.

The circuit board 36 also, approximately centrally and flat and near the surface, has interference resistors and capacitors, not identified by reference numerals, and in the upper region it has the slider switch 38 as well as two LEDs 57, 58 on the upper end for visually indicating the direction of rotation.

The circuit board 36 is located with its long side parallel to the handle 14 and with its short side crosswise to the center plane 15 and is clamped without play in groovelike recesses, not identified by reference numeral, in the two half shells 16, 17 in such a way that it is braced from the inside against the half shells 16, 17 and thus forms a reinforcing rib in the handle 14. Parallel to the circuit board 36, a lithium ion cell with its known advantages as a battery 40 is placed in the handle 14; in the installed state, it is embraced in tonglike fashion by the two half shells 16, 17 and positionally secured and is thus integrated into the strength structure of the housing 12. The battery 40 has a contact plate 42, 43, one at the top and one at the bottom, acting as a soldering lug and wired to the circuit board 36.

Above the ON/OFF button 26—in the nip between the angled handle 14 and the motor housing 12—a slider sensor 39 is located transversely to the center plane 15 of the motor housing 12 and can be displaced back and forth through lateral openings, not identified by reference numeral, in the half shells 16, 17. In forklike fashion, with an approximately central recess identified by reference numeral, the slider sensor 39 embraces a sliding device 41 of a boxlike slider switch 38 that is fixed in the upper region of the circuit board 36. The sliding device 41, placed on the slider switch 38, is adjustable via the slider sensor 39 into the extreme left and extreme right side positions and into a middle position.

A direct current motor 46 in the front region of the motor housing 12 is embraced in tonglike fashion by the half shells 16, 17 after they have been installed and is held in its working position without play, aligned parallel with the gearbox 18 placed in the motor housing 12. The motor 46 has one rear and one front steplike motor collar 48, 49, from which the rear and front ends of the motor shaft 45 emerge. Via its front and rear motor collars 48, 49, the motor 46 is supported, centered in braced fashion, in corresponding bearing-block-like ribs of the half shells 16, 17. The front end 47 of the motor shaft 45 is provided with a flat face or a dihedron, in particular reshaped, and in the installed position with this face or faces reaches into a correspondingly flattened recess of an input pinion 66 of the gear 65, designed as a planetary gear, that is located in the gearbox 18. A force-locking coupling with a coarse dimensional tolerance and ease of installation is thus created, and the motor 46 with the gear 65 and the gearbox 18 can easily be put together and placed, in put-together form, into one of the half shells 16, 17 for further assembly.

On the face end, the two half shells 16, 17 embrace a gearbox 18, mounted as a separate cylindrical structural unit, in tonglike and form-locking fashion and firmly hold it without play. The gearbox, in two axial, tonguelike, partly cylindrical extensions 60, extending toward the motor housing 12, has an annular housing groove 54, which is defined by an annular bead 55. The annular bead 55 engages a fitting counterpart annular bead 56 on the inside of the face end of the half shells 16, 17 of the motor housing 12; counterpart annular beads 53 that fit them on the half shells 16, 17 engage the annular housing groove 54 of the gearbox 18 in form-locking fashion.

Counterpart extensions 61, angled transversely to the longitudinal direction of the motor housing 12, reach without play into the two asymmetrical recesses between the two extensions 60 of the gearbox 18 and at the same time, in the manner of a bearing block, brace the motor collar 58 of the motor 46 in centering fashion, so that the motor collar is likewise integrated into the strength structure of the motor housing 12. No special fastening elements such as screws or the like are then needed. This makes the assembly easier, with a reduced number of individual parts.

At the top, the motor housing 12 has a transparent window 59 placed in it, which extends longitudinally in the parting planes and is split in the middle. Through three openings in the half shells 16, 17, it provides a view to one blue and one red LED 57, 58, each associated with one direction of rotation of the motor shaft 45 and being aligned with it, as well as one charge control light located between the two LEDs.

A power takeoff spindle 20, designed on its face end as a hexagonal socket 21 for receiving fitting standard bits, protrudes at the front from the gearbox 18, which toward the front tapers to a rounded cone. The hexagonal socket 21 is provided with means that firmly hold the screwdriver bit or drill bit, inserted into it, in captive fashion so that for the axial removal of these bits, a certain resistance must be overcome by hand.

Figure 2:
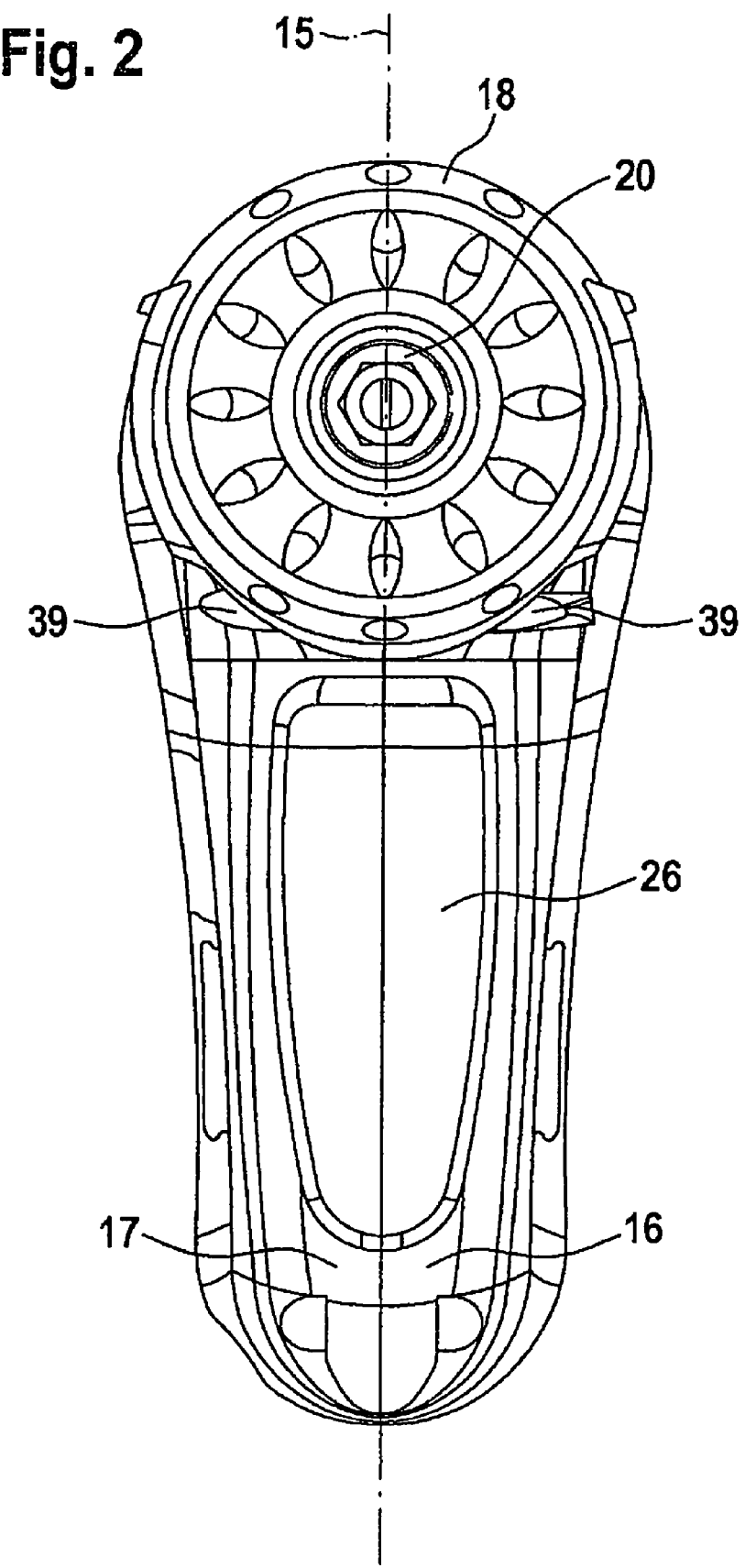
FIG. 2 is a front elevation view of the battery-operated screwdriver.

FIG. 2 shows the battery-operated screwdriver 10 from the front; beyond what FIG. 1 shows, the size ratios of the handle 14 to the length of the ON/OFF button 26 become clear.

Figure 3:
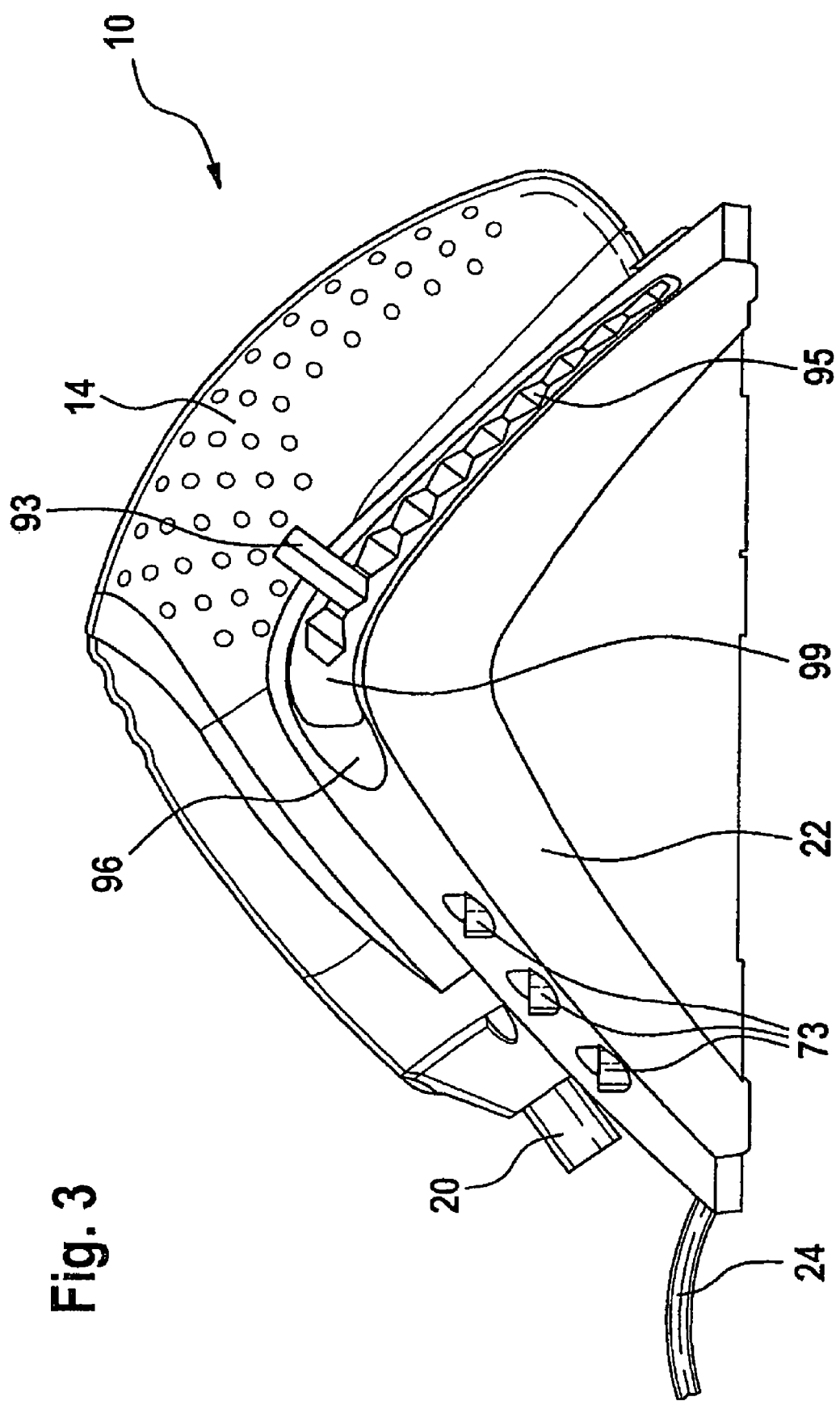
FIG. 3 is a side view of the battery-operated screwdriver, positioned in a charger shell.

FIG. 3 shows a boxlike charger shell 22, whose outer contour, viewed from the side, corresponds to a triangle standing on its base. The oblique faces are adapted to the pistol-shaped contour, facing toward them when the battery-operated screwdriver 10 is placed on them, of the battery-operated screwdriver 10 and are indented in groovelike fashion. The battery-operated screwdriver 10 can therefore enter with its inside into fitting embedding means 25 (FIG. 8) for the handle 14 and for the motor housing 12 and gearbox 18 and can rest therein secured by its own weight; the contacting between its charge contact tongues 38 and the charge contacts 23 of the charger shell 22 is especially secure.

Figure 8:
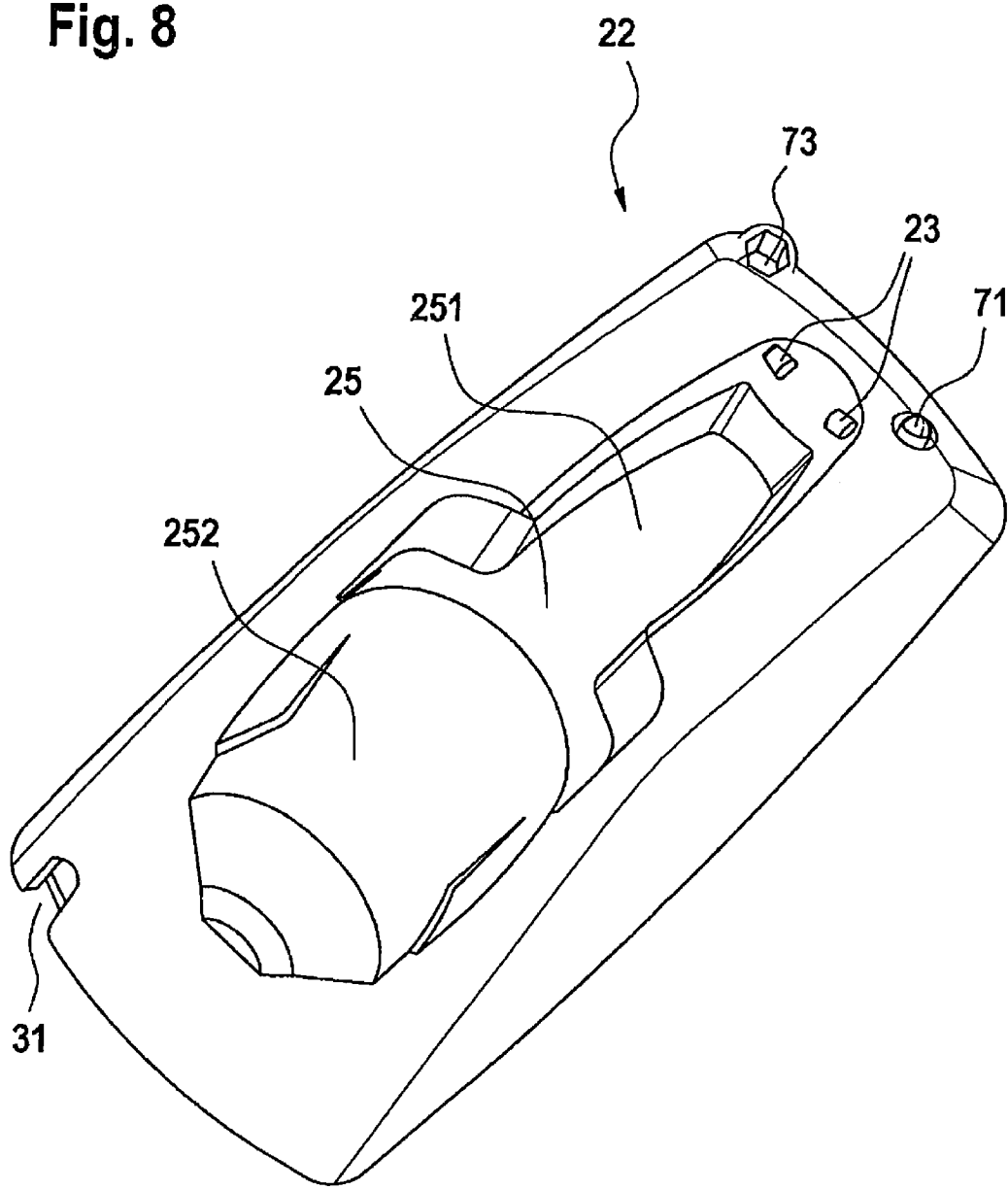
FIG. 8 is a three-dimensional view of a variant of the charger shell seen from above.

The charge contacts 23 protrude upward out of the contour of the embedding means 25 of the charger shell 23, so that when the battery-operated screwdriver 10 is placed in the corresponding embedding means 25 of the charger shell 22, it is braced by its own weight, via its charge contact tongues 37, on the resilient charge contacts 23 (FIG. 8). Solely by placing the battery-operated screwdriver 10 on the intended place of the charger shell 22, the charging state automatically ensues, with an audible click, as a result of mechanically secure contacting, as long as the charger shell 22 is connected to the power grid via its electric cord 24. To that end, the electric cord 24 emerges at the left, in the viewing direction, from the charger shell 22 and extends to the power connection or the power supply of the charger shell 22.

In the rear region, associated with the handle 14 of the battery-operated screwdriver 10, the charger shell 22 has a releasably clipped-in bit holder 99. This bit holder has a plurality of insertion openings 95 for receiving standard screwdriver bits with a hexagonal shaft in captive fashion. The charger shell also, on its top in front of the bit holder 99, has three further, fixed insertion openings 73 for screwdriver or drill bits.

Figure 4:
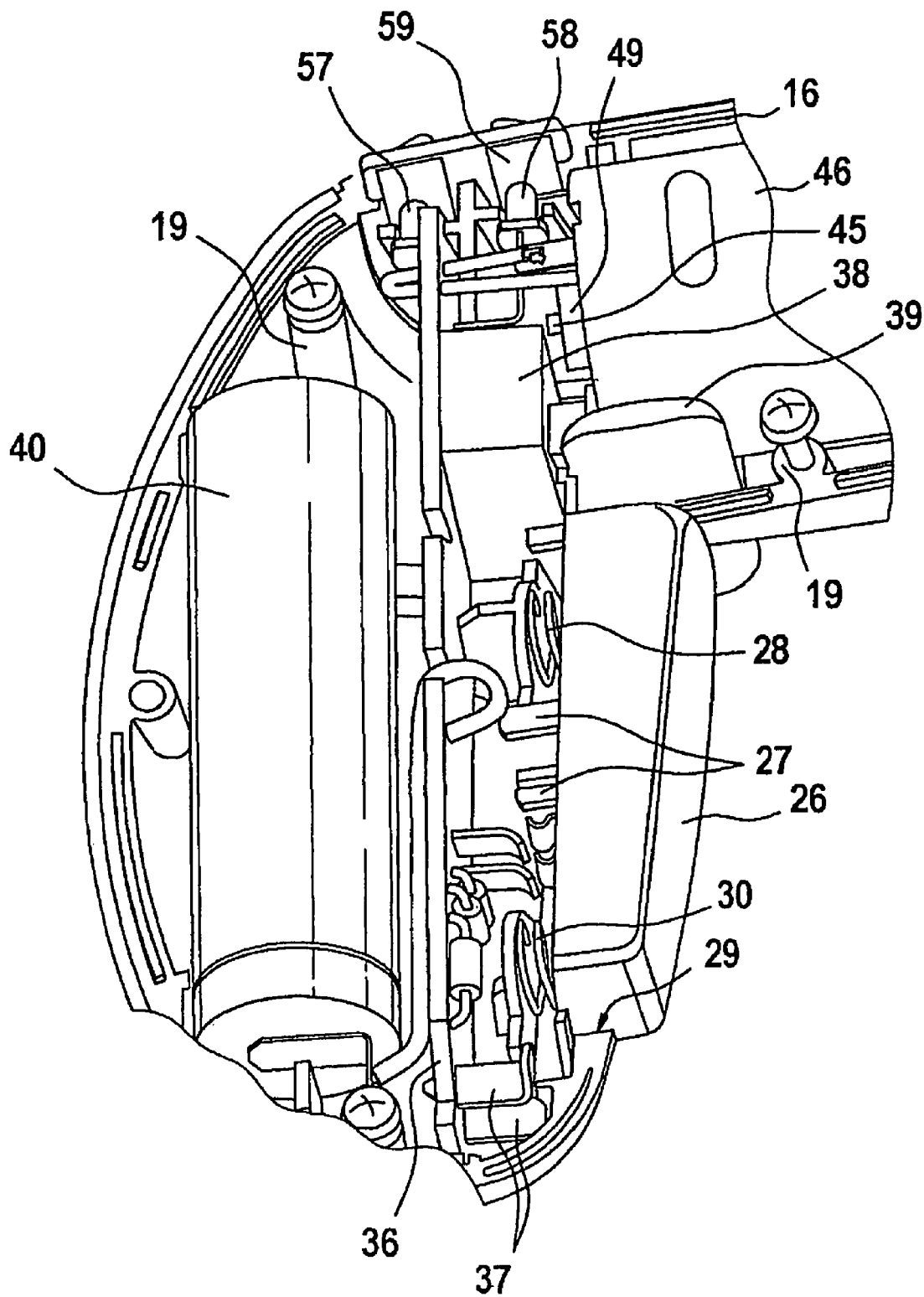
FIG. 4 is an enlarged detail of the grip region of FIG. 1.

FIG. 4 shows an enlarged detail of the first half shell 16 with the individual parts inserted as in FIG. 1; the design of the battery 40 with the adjoining parts as well as of the circuit board 36 with the parts secured to it and of the ON/OFF button 26 and the charge contact tongues 37 is clearly visible.

Figure 5:
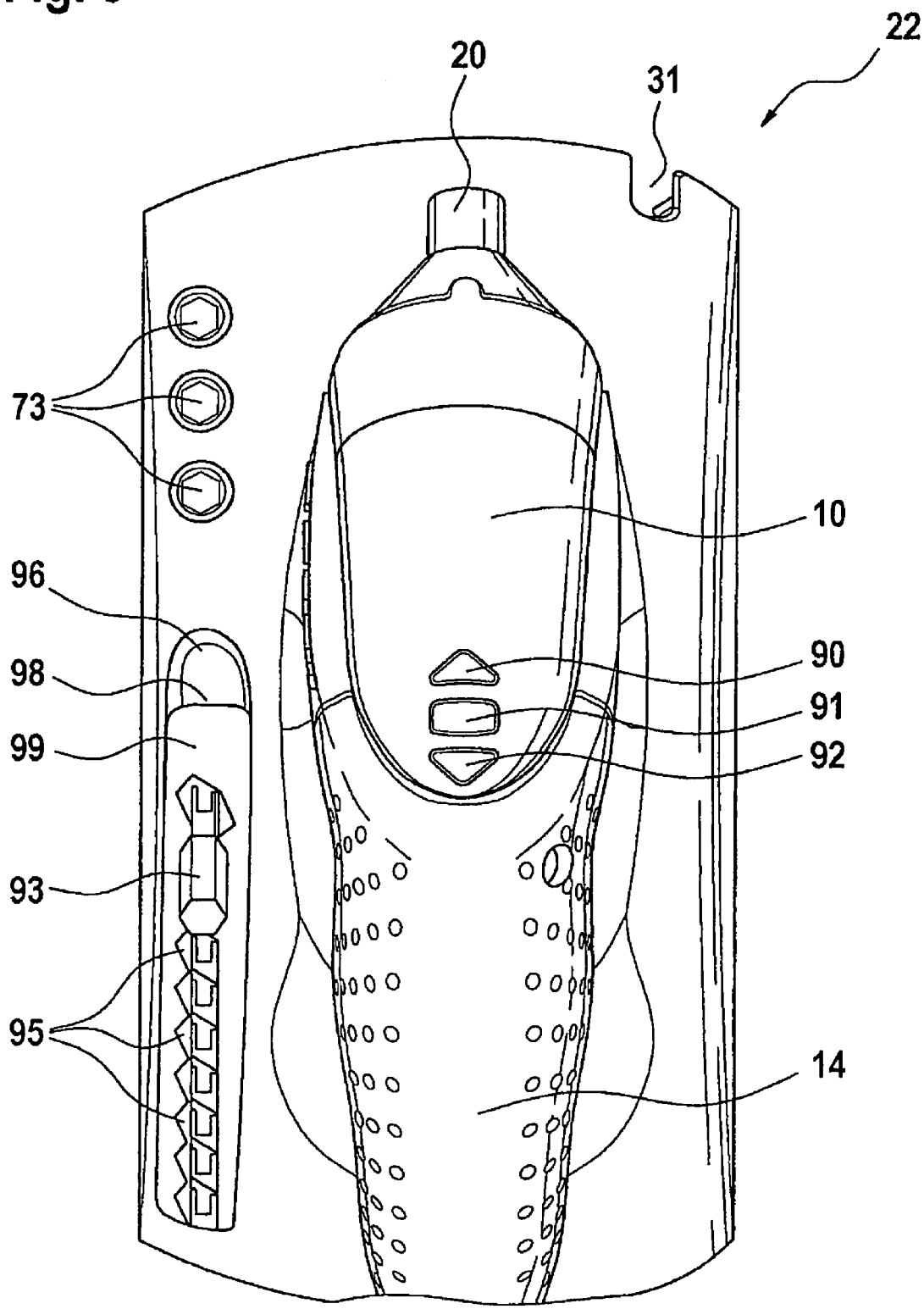
FIG. 5 is a top view on the charger shell with the battery-operated screwdriver in the charging position.

FIG. 5 shows a view from the top on the battery-operated screwdriver 10, seated in the charging position in the charger shell 22; in the viewing direction to the left next to the handle 14 and parallel to it, a red-colored bit holder 99 can be seen. For overlockable reception of the bit holder 99, the charger shell 22 has a groovelike indentation 98, which is undercut in some regions and is slightly narrower than the bit holder 99. Since the bit holder is of elastic material, it can easily be positionally secured, snapping into the indentation 98, when pressed firmly.

The indentation 98 is longer than the bit holder 99, so that once the bit holder 99 has been inserted in the indentation 98 the indentation remains free in a residual region 96 for being grasped from below or for removal of the bit holder 99 using one finger.

Hexagonal bits 93 can be secured in captive fashion, held by force locking in spring-elastically constrictable compartments 95 in the magazine-like bit holder 99, virtually perpendicular to the outer contour of the oblique faces of the charger shell 22.

At the top rear center, the battery-operated screwdriver 10 has one forward-pointing and one rear-pointing, arrow-shaped window 90, 92 each, beneath which an LED that indicates the direction of rotation is seated—as well as a rectangular window 91, located between them, beneath which a charge control light is seated.

Figure 6:
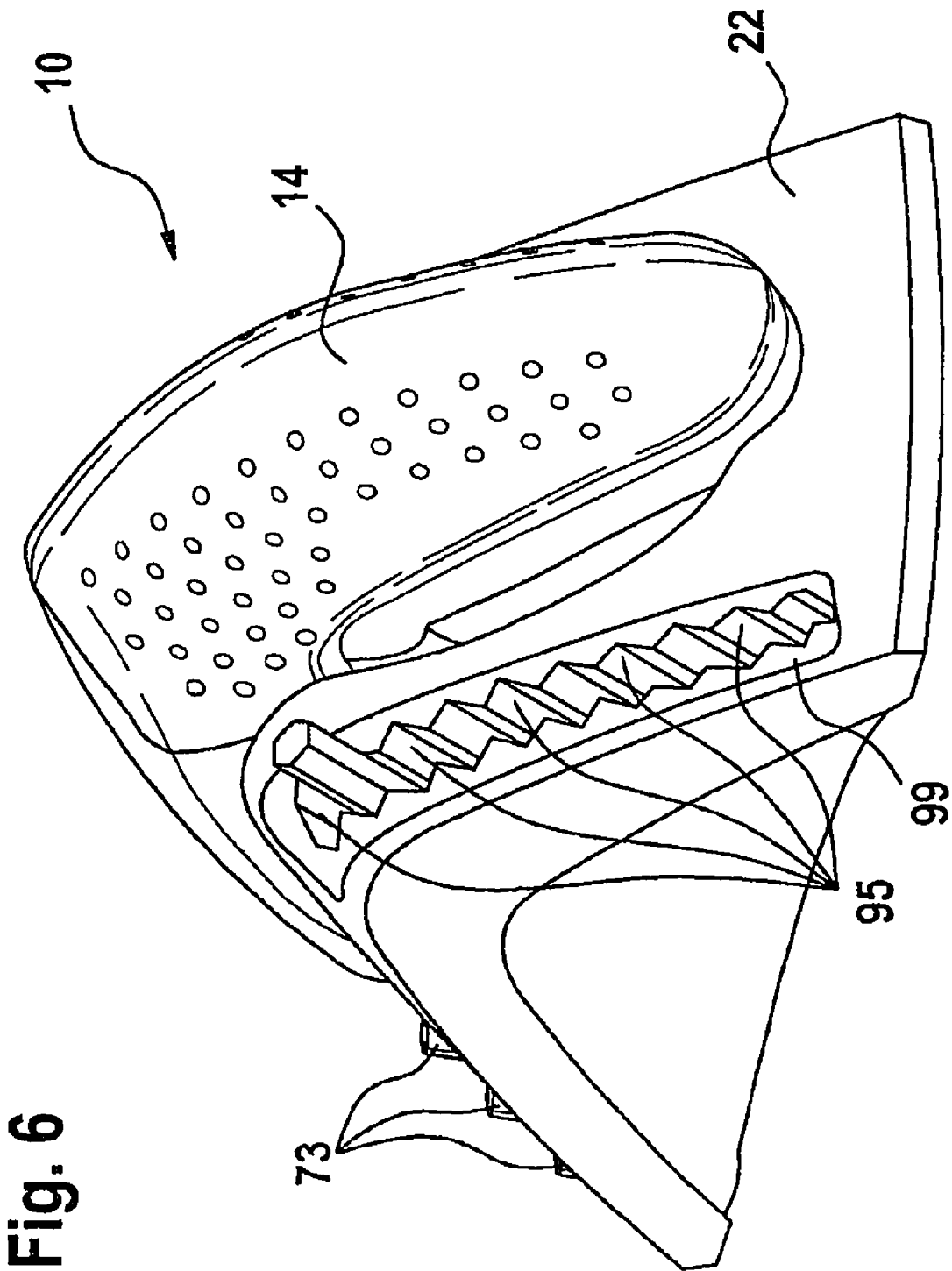
FIG. 6 is a view from behind of the charger shell with the battery-operated screwdriver of FIG. 5.

FIG. 6 shows a view of the charger shell 22 obliquely from behind with the battery-operated screwdriver 10 placed on it. The removable bit holder 99 with approximately ten compartments 93 for inserting screwdriver bits as in FIG. 5 can be seen along with the three fixed bit insertion openings 73 in the front region of the charger shell 22. It can be seen that the bit holder 99 is fitted flush into the outer contour of the upper region of the charger shell 22.

Figure 7:
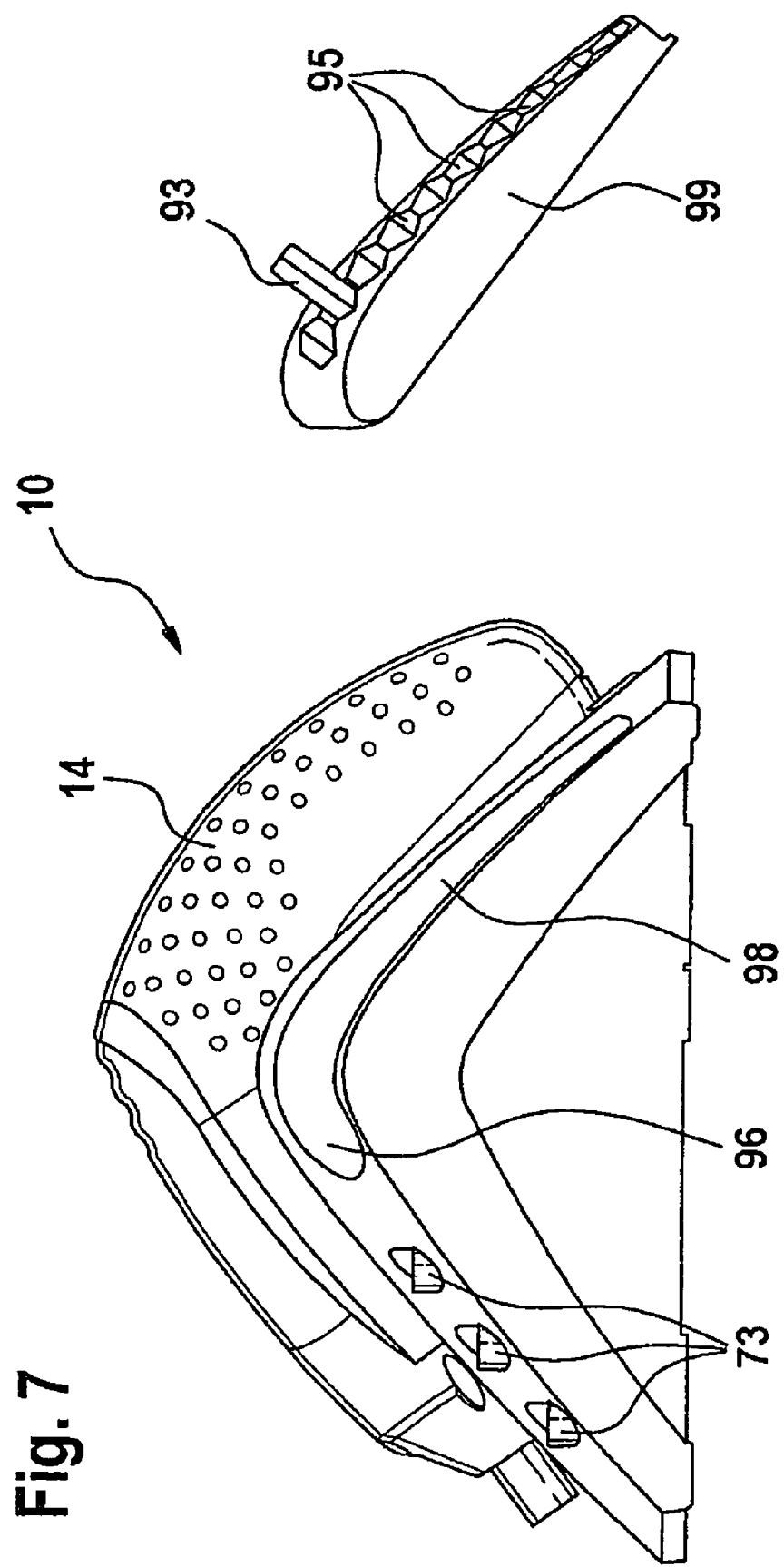
FIG. 7 is a side view of the charger shell with the battery-operated screwdriver of FIG. 5, with a separate bit holder.

FIG. 7 shows a side view of the charger shell 22 with the battery-operated screwdriver 10 placed on it, along with the bit holder 99 shown to the left of it in the viewing direction and located separately.

FIG. 8 shows a top view on the charger shell 22, looking toward the embedding means 25, which is subdivided into a handle bed 251 and a gearbox bed 252, so that the battery-operated screwdriver 10 can be placed flush and virtually without play, unambiguously and in foolproof fashion, in the charger shell 22 in such a way that it rests securely, and its charge contact tongues 37 (FIGS. 1, 2, 4) gain a secure contact with the charge contacts 23 of the charger shell 22.

It will be understood that each of the elements described above, or two or more together, may also find a useful application in other types of constructions differing from the types described above.

While the invention has been illustrated and described as embodied in a battery-operated screwdriver, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is Set forth in the appended claims.

What is claimed:

1. A charger shell for a battery-operated screwdriver, comprising:
   at least one detachably mountable bit holder that is configured to receive a plurality of bits, which in operation can be inserted in communication with a battery-operated screwdriver;
   wherein the bit holder has a plurality of insertion openings for receiving the plurality of bits.

2. The charger shell of claim 1, wherein the bit holder is received in the charger shell in an overlockable fashion.

3. The charger shell of claim 1, wherein the charger shell has a groove-like indentation configured to receive the bit holder.

4. The charger shell of claim 3, wherein the indentation is slightly narrower than the bit holder.

5. The charger shell of claim 1, wherein the bit holder is made of an elastic material.

6. A charger shell for a battery-operated screwdriver, comprising:
   at least one detachably mountable bit holder that is configured to receive a plurality of bits, which in operation can be inserted in communication with a battery-operated screwdriver;
   wherein the bit holder has a plurality of insertion openings for receiving the plurality of bits
   wherein the charger shell has a groove-like indentation configured to receive the bit holder, and
   wherein the indentation is longer than the bit holder such that when the bit holder is inserted into the indentation, the indentation remains free in a residual region for removing the bit holder using a finger.

7. A charger shell for a battery-operated screwdriver, comprising:
   at least one detachably mountable bit holder that is configured to receive a plurality of bits, which in operation can be inserted in communication with a battery-operated screwdriver;
   wherein the bit holder has a plurality of insertion openings for receiving the plurality of bits, and
   wherein the charger shell has an outer contour which corresponds to a triangle standing on its base when viewed from the side.

8. The charger shell of claim 7, wherein oblique faces of the charger shell are adapted to a pistol-shaped contour of the battery-operated screwdriver.

9. The charger shell of claim 7, wherein the charger shell has an embedding arrangement which is subdivided into a handle bed and a gearbox bed.

10. The charger shell of claim 7, wherein charge contacts protrude upwardly out of a contour of the embedding arrangement.

11. A charger shell for a battery-operated power tool, comprising:
    at least one detachably mountable bit holder that is configured to receive a plurality of bits, which in operation can be inserted in communication with a battery-operated powertool;
    wherein the bit holder has a plurality of insertion openings for receiving the plurality of bits.

12. The charger shell of claim 11, wherein the bit holder is received in the charger shell in an overlockable fashion.

13. The charger shell of claim 11, wherein the charger shell has a groove-like indentation configured to receive the bit holder.

14. The charger shell of claim 13, wherein the indentation is slightly narrower than the bit holder.

15. The charger shell of claim 11, wherein the bit holder is made of an elastic material.

16. The charger shell of claim 11, wherein the powertool is a power drill.

17. A charger shell for a battery-operated power tool, comprising:
    at least one detachably mountable bit holder that is configured to receive a plurality of bits, which in operation can be inserted in communication with a battery-operated powertool;
    wherein the bit holder has a plurality of insertion openings for receiving the plurality of bits,
    wherein the charger shell has a groove-like indentation configured to receive the bit holder, and
    wherein the indentation is longer than the bit holder such that when the bit holder is inserted into the indentation, the indentation remains free in a residual region for removing the bit holder using a finger.

18. The charger shell of claim 17, wherein the powertool is a power drill.

19. A charger shell for a battery-operated power tool, comprising:
   at least one detachably mountable bit holder that is configured to receive a plurality of bits, which in operation can be inserted in communication with a battery-operated powertool;
   wherein the bit holder has a plurality of insertion openings for receiving the plurality of bits, and
   wherein the charger shell has an outer contour which corresponds to a triangle standing on its base when viewed from the side.

20. The charger shell of claim 19, wherein oblique faces of the charger shell are adapted to a pistol-shaped contour of the battery-operated powertool.

21. The charger shell of claim 19, wherein the charger shell has an embedding arrangement which is subdivided into a handle bed and a gearbox bed.

22. The charger shell of claim 21, wherein charge contacts protrude upwardly out of a contour of the embedding arrangement.

23. The charger shell of claim 19, wherein the powertool is a power drill.

\* \* \* \* \*